US012604325B2

(12) United States Patent
Yuan et al.

(10) Patent No.: US 12,604,325 B2
(45) Date of Patent: Apr. 14, 2026

(54) ACKNOWLEDGEMENT LOCATION AND TIMING FOR GROUP-COMMON DOWNLINK CONTROL INFORMATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/906,029

(22) PCT Filed: Apr. 30, 2020

(86) PCT No.: PCT/CN2020/087948
§ 371 (c)(1),
(2) Date: Sep. 9, 2022

(87) PCT Pub. No.: WO2021/217538
PCT Pub. Date: Nov. 4, 2021

(65) Prior Publication Data
US 2023/0094100 A1 Mar. 30, 2023

(51) Int. Cl.
*H04W 72/21* (2023.01)
*H04W 72/232* (2023.01)

(52) U.S. Cl.
CPC ......... *H04W 72/232* (2023.01); *H04W 72/21* (2023.01)

(58) Field of Classification Search
CPC .... H04L 5/0053; H04L 5/0055; H04W 72/21; H04W 72/232
See application file for complete search history.

(56) References Cited

U.S. PATENT DOCUMENTS

| | | | |
|---|---|---|---|
| 8,830,883 B2 | 9/2014 | Chen et al. | |
| 11,356,989 B2 | 6/2022 | Zhang et al. | |
| 2020/0015209 A1* | 1/2020 | Zhang | H04W 68/005 |

(Continued)

FOREIGN PATENT DOCUMENTS

| | | |
|---|---|---|
| CN | 104168591 A | 11/2014 |
| CN | 106856613 A | 6/2017 |
| CN | 109964434 A | 7/2019 |

(Continued)

OTHER PUBLICATIONS

Supplementary European Search Report—EP20933536—Search Authority—The Hague—Nov. 29, 2023.

(Continued)

*Primary Examiner* — Asad M Nawaz
*Assistant Examiner* — Natali Pascual Peguero
(74) *Attorney, Agent, or Firm* — Harrity & Harrity, LLP

(57) ABSTRACT

Various aspects of the present disclosure generally relate to wireless communication. In some aspects, a user equipment (UE) may determine a physical uplink control channel resource, dedicated to the UE for transmitting a feedback message for group-common downlink control information (DCI), based at least in part on a resource configuration. The UE may transmit the feedback message based at least in part on whether the group-common DCI is successfully received. Numerous other aspects are provided.

34 Claims, 10 Drawing Sheets

(56) References Cited

U.S. PATENT DOCUMENTS

2021/0100013 A1 * 4/2021 Khoshnevisan ...... H04L 1/0061

FOREIGN PATENT DOCUMENTS

| EP | 3461221 | A1 | 3/2019 |
| EP | 3598672 | A1 | 1/2020 |
| WO | 2012068141 | A1 | 5/2012 |

OTHER PUBLICATIONS

International Search Report and Written Opinion—PCT/CN2020/087948—ISA/EPO—Jan. 26, 2021.
VIVO: "Discussion on HARQ Operation for NR-U", 3GPP Draft, 3GPP TSG RAN WG1#97, R1-1906132, Reno, USA, May 13-17, 2019, 6 Pages, section 2.

* cited by examiner

400

500

Figure 6:
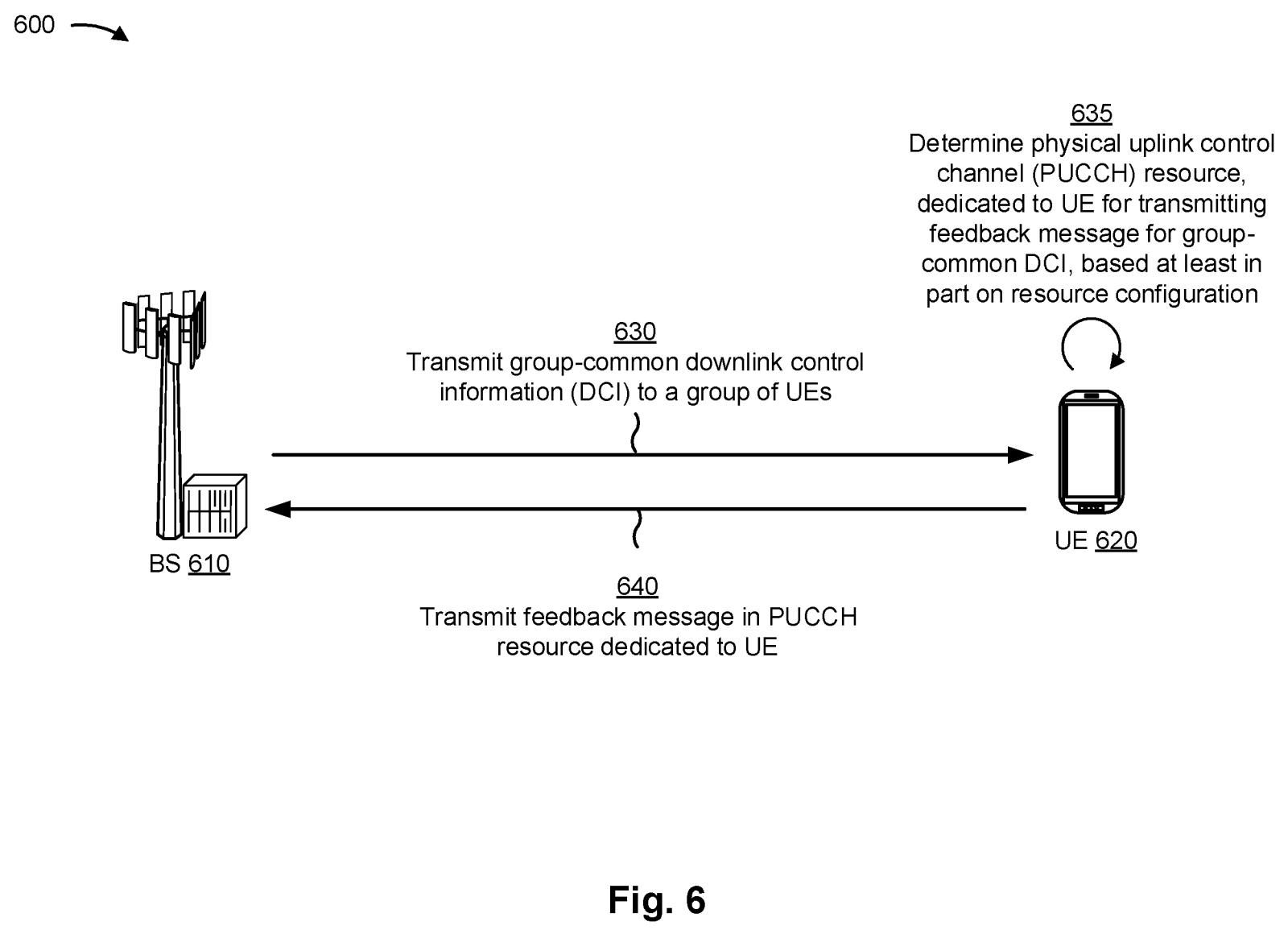

600

635
Determine physical uplink control channel (PUCCH) resource, dedicated to UE for transmitting feedback message for group-common DCI, based at least in part on resource configuration

UE 620

630
Transmit group-common downlink control information (DCI) to a group of UEs

640
Transmit feedback message in PUCCH resource dedicated to UE

910 — Determine a physical uplink control channel (PUCCH) resource, dedicated to the UE for transmitting a feedback message for group-common downlink control information (DCI), based at least in part on a resource configuration 920 — Transmit the feedback message based at least in part on whether the group-common DCI is successfully received

900

1010    Transmit group-common DCI to a group of UEs

1020    Determine a PUCCH resource, dedicated to a UE in the group of UEs for transmitting a feedback message for the group-common DCI, based at least in part on a resource configuration for the UE 1030    Receive the feedback message from the UE in the PUCCH resource dedicated to the UE

1000

ACKNOWLEDGEMENT LOCATION AND TIMING FOR GROUP-COMMON DOWNLINK CONTROL INFORMATION

CROSS-REFERENCE TO RELATED APPLICATIONS

This application is a 371 national stage of PCT Application No. PCT/CN2020/087948 filed on Apr. 30, 2020, entitled "ACKNOWLEDGEMENT LOCATION AND TIMING FOR GROUP-COMMON DOWNLINK CONTROL INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for acknowledgment location and timing for group-common downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a physical uplink control channel (PUCCH) resource, dedicated to the UE for transmitting a feedback message for group-common downlink control information (DCI), based at least in part on a resource configuration. The method may include transmitting the feedback message based at least in part on whether the group-common DCI is successfully received.

In some aspects, a method of wireless communication, performed by a base station, may include transmitting group-common DCI to a group of UEs and determining a PUCCH resource, dedicated to a UE in the group of UEs for transmitting a feedback message for the group-common DCI, based at least in part on a resource configuration for the UE. The method may include receiving the feedback message from the UE in the PUCCH resource dedicated to the UE.

In some aspects, a UE for wireless communication may include a memory and one or more processors operatively coupled to the memory. The memory and the one or more processors may be configured to determine a PUCCH resource, dedicated to the UE for transmitting a feedback message for group-common DCI, based at least in part on a resource configuration, and transmit the feedback message based at least in part on whether the group-common DCI is successfully received.

In some aspects, a base station for wireless communication may include a memory and one or more processors operatively coupled to the memory. The memory and the one or more processors may be configured to transmit group-common DCI to a group of UEs, determine a PUCCH resource, dedicated to a UE in the group of UEs for transmitting a feedback message for the group-common DCI, based at least in part on a resource configuration for the UE, and receive the feedback message from the UE in the PUCCH resource dedicated to the UE.

In some aspects, a non-transitory computer-readable medium may store one or more instructions for wireless communication. The one or more instructions, when executed by one or more processors of a UE, may cause the one or more processors to determine a PUCCH resource, dedicated to the UE for transmitting a feedback message for group-common DCI, based at least in part on a resource configuration, and transmit the feedback message based at least in part on whether the group-common DCI is successfully received.

In some aspects, a non-transitory computer-readable medium may store one or more instructions for wireless communication. The one or more instructions, when executed by one or more processors of a base station, may cause the one or more processors to transmit group-common DCI to a group of UEs, determine a PUCCH resource, dedicated to a UE in the group of UEs for transmitting a feedback message for the group-common DCI, based at least in part on a resource configuration for the UE, and receive the feedback message from the UE in the PUCCH resource dedicated to the UE.

In some aspects, an apparatus for wireless communication may include means for determining a physical uplink control channel resource, dedicated to the apparatus for transmitting a feedback message for group-common DCI, based at least in part on a resource configuration, and means for transmitting the feedback message based at least in part on whether the group-common DCI is successfully received.

In some aspects, an apparatus for wireless communication may include means for transmitting group-common DCI to a group of UEs, means for determining a PUCCH resource, dedicated to a UE in the group of UEs for transmitting a feedback message for the group-common DCI, based at least in part on a resource configuration for the UE, and means for receiving the feedback message from the UE in the PUCCH resource dedicated to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of acknowledgment locations for group-common DCI, in accordance with various aspects of the present disclosure.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
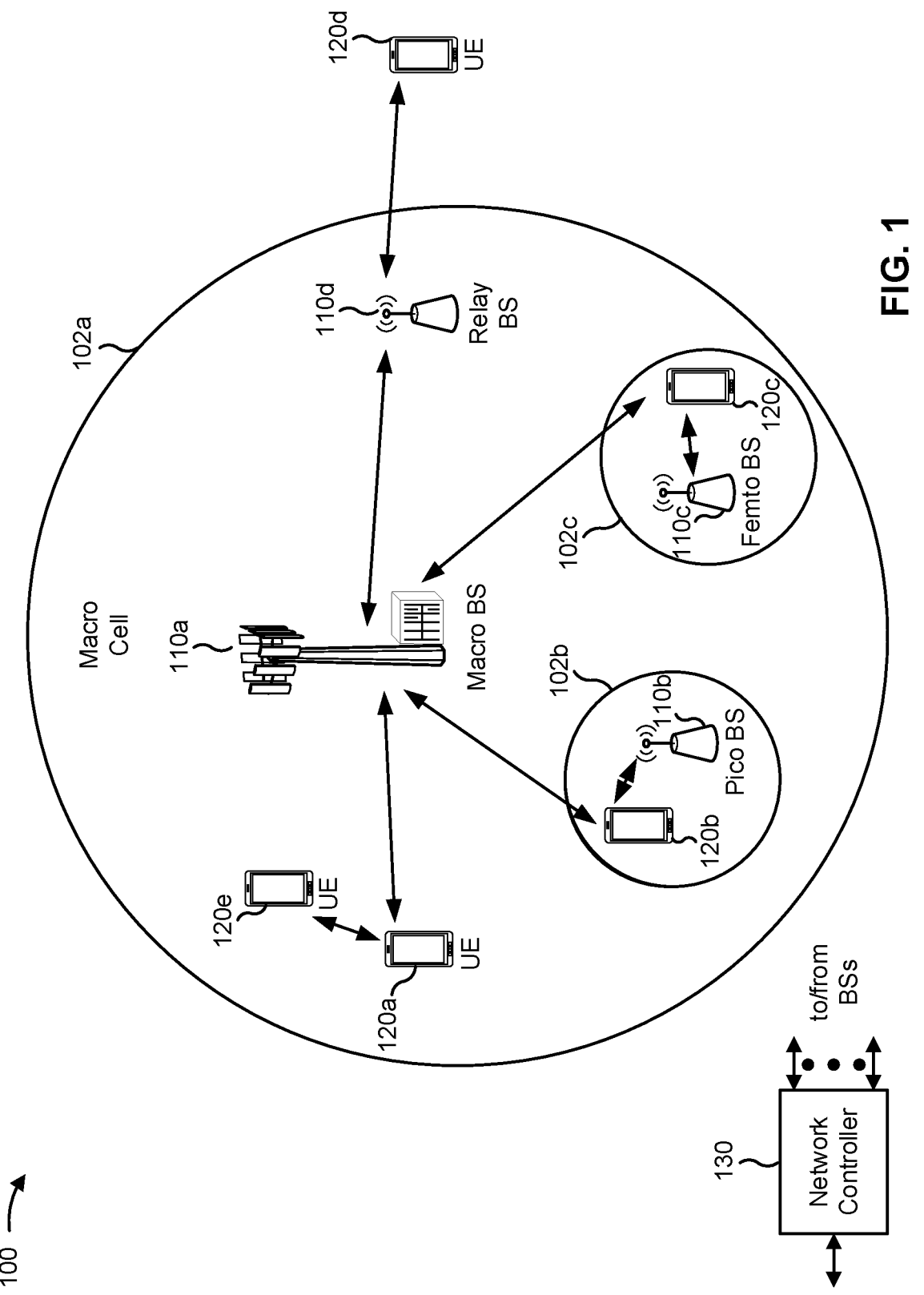
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
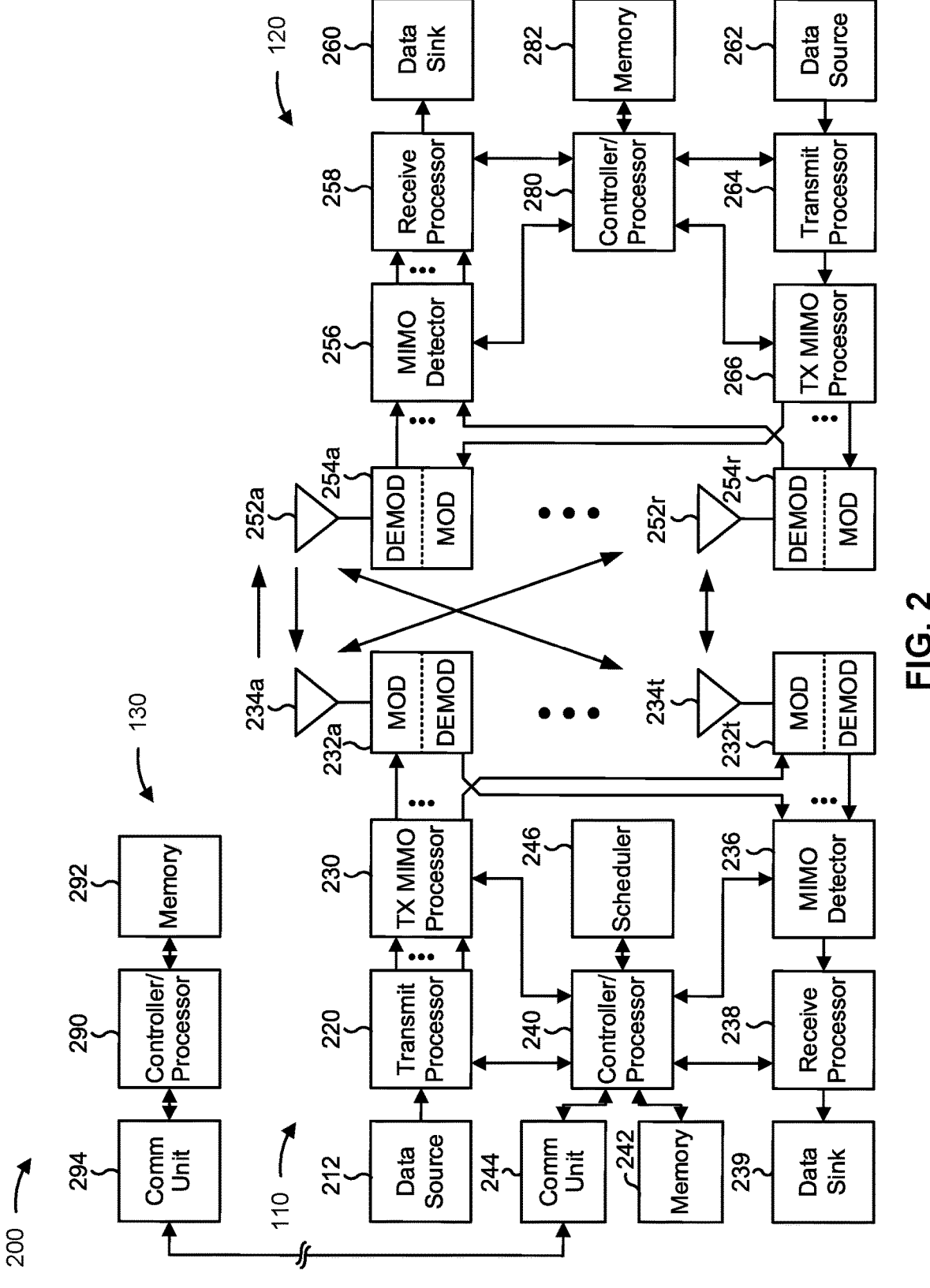
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-10.

Controller/processor 240 of base station 110, controller/processor 280 of UE 120, and/or any other component(s) of FIG. 2 may perform one or more techniques associated with acknowledgment location and timing for group-common DCI, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining a PUCCH resource, dedicated to the UE for transmitting a feedback message for group-common DCI, based at least in part on a resource configuration, means for transmitting the feedback message based at least in part on whether the group-common DCI is successfully received, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting group-common DCI to a group of UEs, means for determining a PUCCH resource, dedicated to a UE in the group of UEs for transmitting a feedback message for the group-common DCI, based at least in part on a resource configuration for the UE, means for receiving the feedback message from the UE in the PUCCH resource dedicated to the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
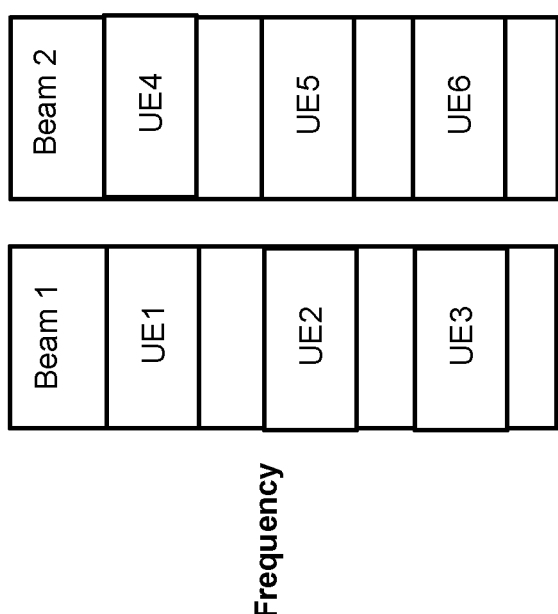
FIG. 3 is a diagram illustrating an example of beam sweeping with groups of UEs, in accordance with various aspects of the present disclosure.
Figure 3:
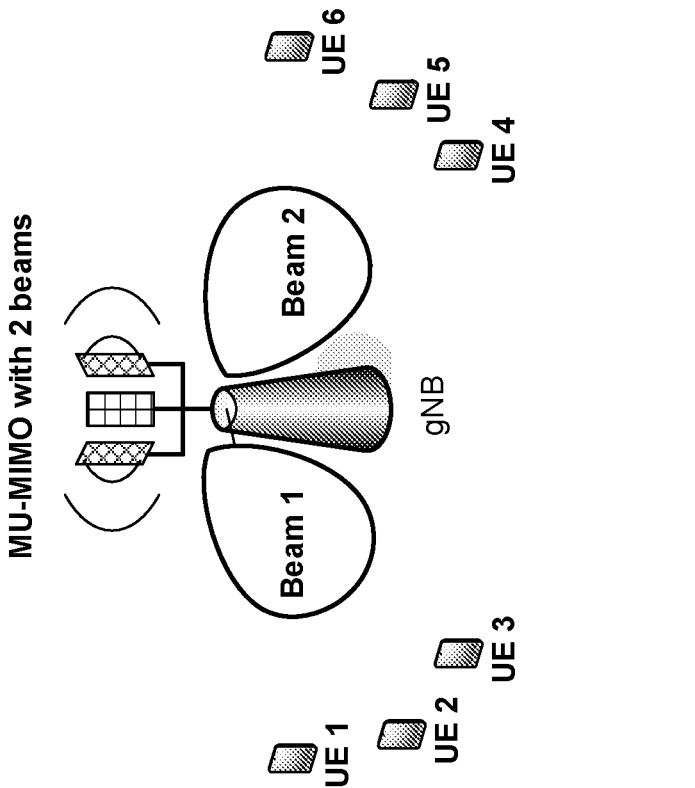

FIG. 3 is a diagram illustrating an example 300 of beam sweeping with groups of UEs, in accordance with various aspects of the present disclosure. FIG. 3 shows a base station (e.g., gNB) with an antenna array that is split into multiple sub-arrays for multi-user MIMO (MU-MIMO). The gNB may use the sub-arrays to transmit multiple beams, where each beam can serve a group of UEs.

FIG. 3 shows that the gNB may transmit at least two beams, a first beam for a first group of UEs (e.g., UE1, UE2, and UE3) and a second beam for a second group of UEs (e.g., UE4, UE5, and UE6). The UEs of each group may be grouped together because they are spatially dense and/or in a same beam direction. Some UEs (e.g., Internet-of-things UEs) may not require a large bandwidth for a payload, and it may be appropriate to group such UEs so as to be covered by a single beam. The gNB may update information for a group of UEs based at least in part on UE mobility and/or environmental mobility. By grouping UEs into a single beam, the gNB reduces beam measurement and reporting overhead. The gNB also reduces beam sweep signaling overhead.

In some aspects, the gNB may use frequency division multiplexing (FDM) to save spatial dimensions for multiplexing UEs in different directions. FIG. 3 (right side) shows that UE1, UE2, and UE3 may be assigned different frequencies in the first beam and that UE4, UE5, and UE6 may be assigned different frequencies in the second beam.

As indicated above, FIG. 3 is provided as an example. Other examples may differ from what is described with respect to FIG. 3.

Figure 4:
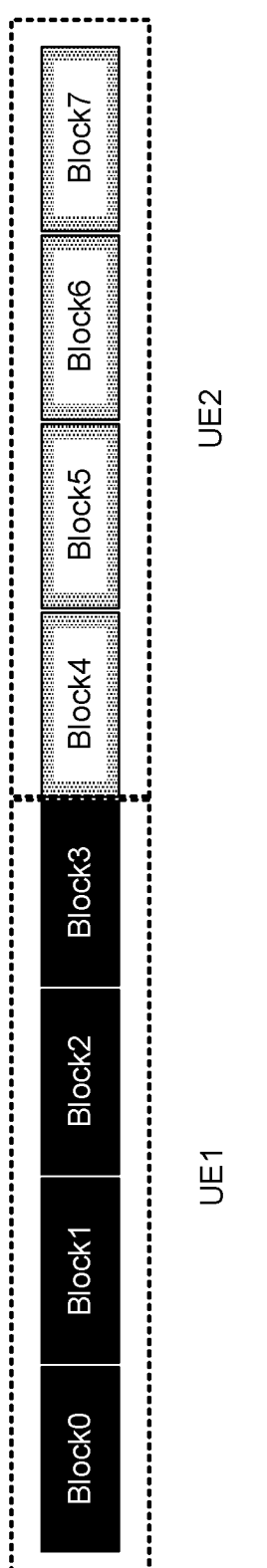
FIG. 4 is a diagram illustrating an example of group-common downlink control information (DCI), in accordance with various aspects of the present disclosure.

FIG. 4 is a diagram illustrating an example 400 of group-common DCI, in accordance with various aspects of the present disclosure. The group-common DCI shown in FIG. 4 may be referred to as DCI format 2_x and may be used for a group of UEs (e.g., U1 and UE2).

The group-common DCI may include multiple indication blocks that indicate control information that is common to the group of UEs and/or specific to individual UEs. For example, indication blocks 0-3 (first portion) in example 400 are specific to UE1, and indication blocks 4-7 (second portion) are specific to UE2. The gNB may configure a start of each indication block with a radio resource control (RRC) message.

The group-common DCI may be scrambled by a radio network temporary identifier (RNTI) that is shared by the group of UEs. Examples of the RNTI include a transmit power control (TPC)-PUCCH-RNTI or a TPC-physical uplink shared channel (PUSCH)-RNTI.

As indicated above, FIG. 4 is provided as an example. Other examples may differ from what is described with respect to FIG. 4.

Figure 5:
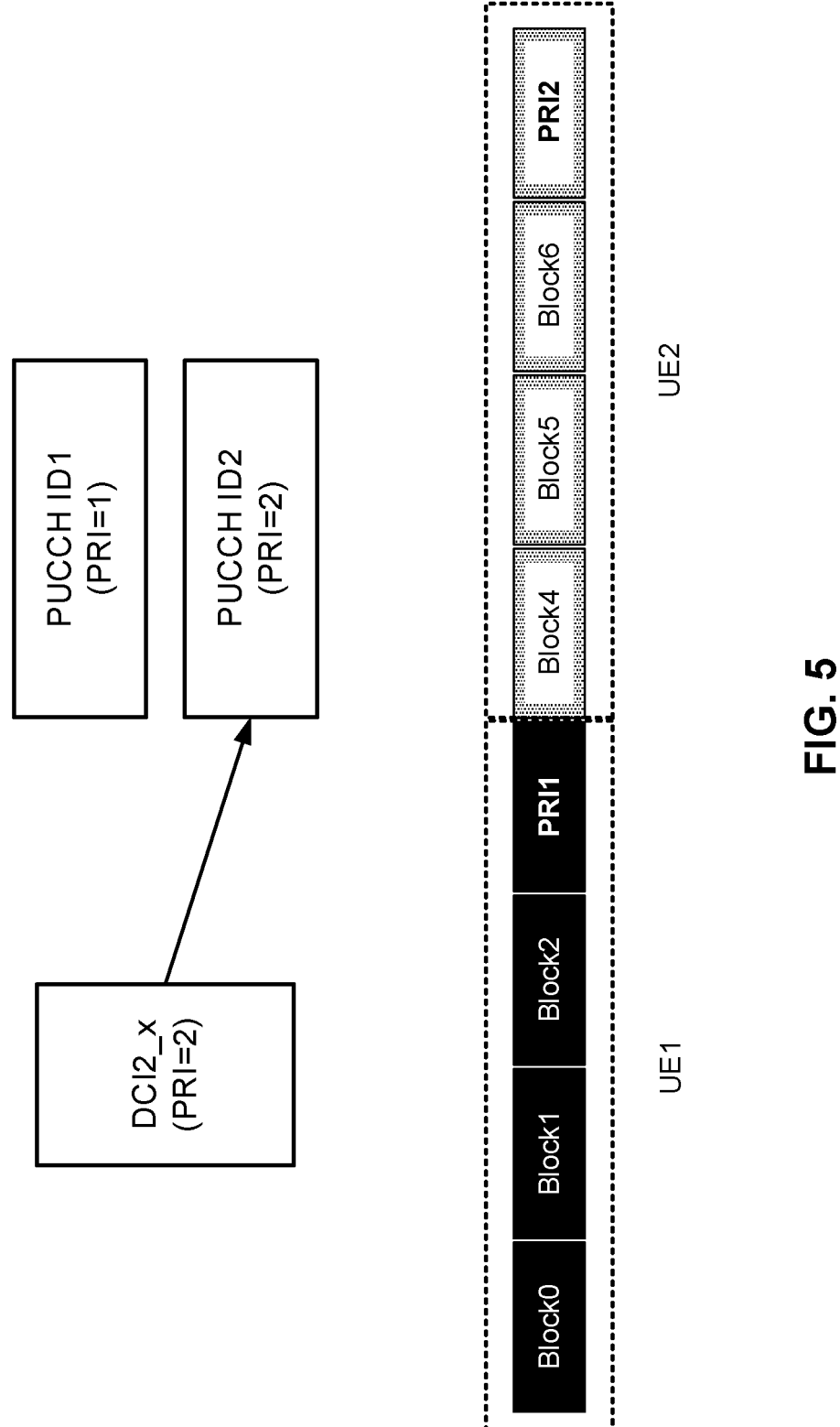
FIG. 5 is a diagram illustrating an example of acknowledgment locations for group-common DCI, in accordance with various aspects of the present disclosure.

FIG. 5 is a diagram illustrating an example 500 of acknowledgment locations for group-common DCI, in accordance with various aspects of the present disclosure.

A base station (e.g., gNB) may transmit a group-common DCI in a beam for a group of UEs, but the gNB may not be able to determine which UEs are receiving the group-common DCI. If the gNB is not able to determine which UEs are receiving or not receiving the group-common DCI, communications with one or more UEs become degraded. The gNB also wastes processing and signaling resources communicating with UEs that have not successfully received the group-common DCI.

According to various aspects described herein, the gNB may configure individual UEs in a group of UEs to use a PUCCH resource that is specific to an individual UE. For example, the gNB may transmit a resource configuration to UE1, specifying a PUCCH resource dedicated to UE1 for providing a feedback message. UE1 may transmit an acknowledgment message if the group-common DCI is successfully received, or transmit a negative acknowledgement if the group-common DCI is not successfully received. The gNB may receive the feedback message for UE1 in the PUCCH resource that is dedicated to UE1. In this way, UE1 may provide a low overhead feedback message (e.g., 1 bit) and the gNB may identify which UE is providing the feedback message. Accordingly, the gNB may schedule a communication with UE1 based at least in part on receiving the feedback message. If the gNB receives a negative acknowledgment or no acknowledgment from UE1, the gNB may determine to not schedule a communication with UE1, or may address an issue with UE1. As a result, the gNB saves processing and signaling resources by communicating with UEs that have provided a positive feedback message, and by receiving the feedback from the UEs in a simplified manner.

In some aspects, the gNB may transmit an indication of a dedicated PUCCH resource via an RRC message. Alternatively, a dedicated PUCCH resource may be pre-determined, such as the PUCCH resource with the lowest identifier. In some aspects, the gNB may transmit PUCCH resource indicators for UEs in the group-common DCI. For example, FIG. 5 shows indicator blocks of a group-common DCI that are applicable to UE1 and UE2. The group-common DCI includes an indicator block with a PUCCH resource indicator (PRI) for UE2 (labeled as PRI2). The PRI2 may be in a located in a portion (second four indicator blocks) associated with UE2. In some aspects, UE2 may determine a location in which to find PRI2 from a resource configuration.

As indicated above, FIG. 5 is provided as an example. Other examples may differ from what is described with respect to FIG. 5.

FIG. 6 is a diagram illustrating an example 600 of acknowledgment locations for group-common DCI, in accordance with various aspects of the present disclosure. FIG. 6 shows a base station (BS) 610 (e.g., a BS 110 depicted in FIGS. 1 and 2, the gNB depicted in FIG. 3, and/or the like) and a UE 620 (e.g., UE 120 depicted in FIGS. 1 and 2, a UE depicted in FIGS. 3-5 and 7, and/or the like) that may communicate with each other. UE 620 may be a UE in a group of UEs.

As shown by reference number 630, BS 610 may transmit a group-common DCI to a group of UEs that includes UE 620. In some aspects, the group-common DCI may indicate a PUCCH resource that is dedicated for a feedback message by UE 620. As shown by reference number 635, UE 620 may determine the PUCCH resource dedicated to UE 620, based at least in part on a resource configuration. BS 610 may have transmitted the resource configuration (e.g., via an RRC message) or UE 620 may have stored configuration information that includes the resource configuration (the resource configuration may be predetermined). In some aspects, the resource configuration may specify the PUCCH resource dedicated to UE 620. In some aspects, the resource configuration may specify which indicator block in the group-common DCI will indicate the PUCCH resource dedicated to UE 620. As shown by reference number 640, UE 620 may transmit a feedback message in the PUCCH resource dedicated to UE 620.

In some aspects, BS 610 may configure UE 620 with a particular timing for transmitting the feedback message. For example, BS 610 may configure UE 620 with a specific amount of time to wait, after receiving an end of the group-common DCI, before starting to transmit the feedback message on a PUCCH resource. The specified amount of time may be referred to as a "K4" value. In some aspects, BS 610 may configure UE 620 with the specified amount of time via an RRC message. In some aspects, the specified amount of time may be a predetermined amount of time, such as four slots. In some aspects, the specified amount of time may be defined in stored configuration information or in the resource configuration. In some aspects, BS 610 may indicate the specified amount of time in the group-common DCI. As a result of knowing when to expect a feedback message from a particular UE, BS 610 may save processing and signaling resources.

As indicated above, FIG. 6 is provided as an example. Other examples may differ from what is described with respect to FIG. 6.

Figure 7:
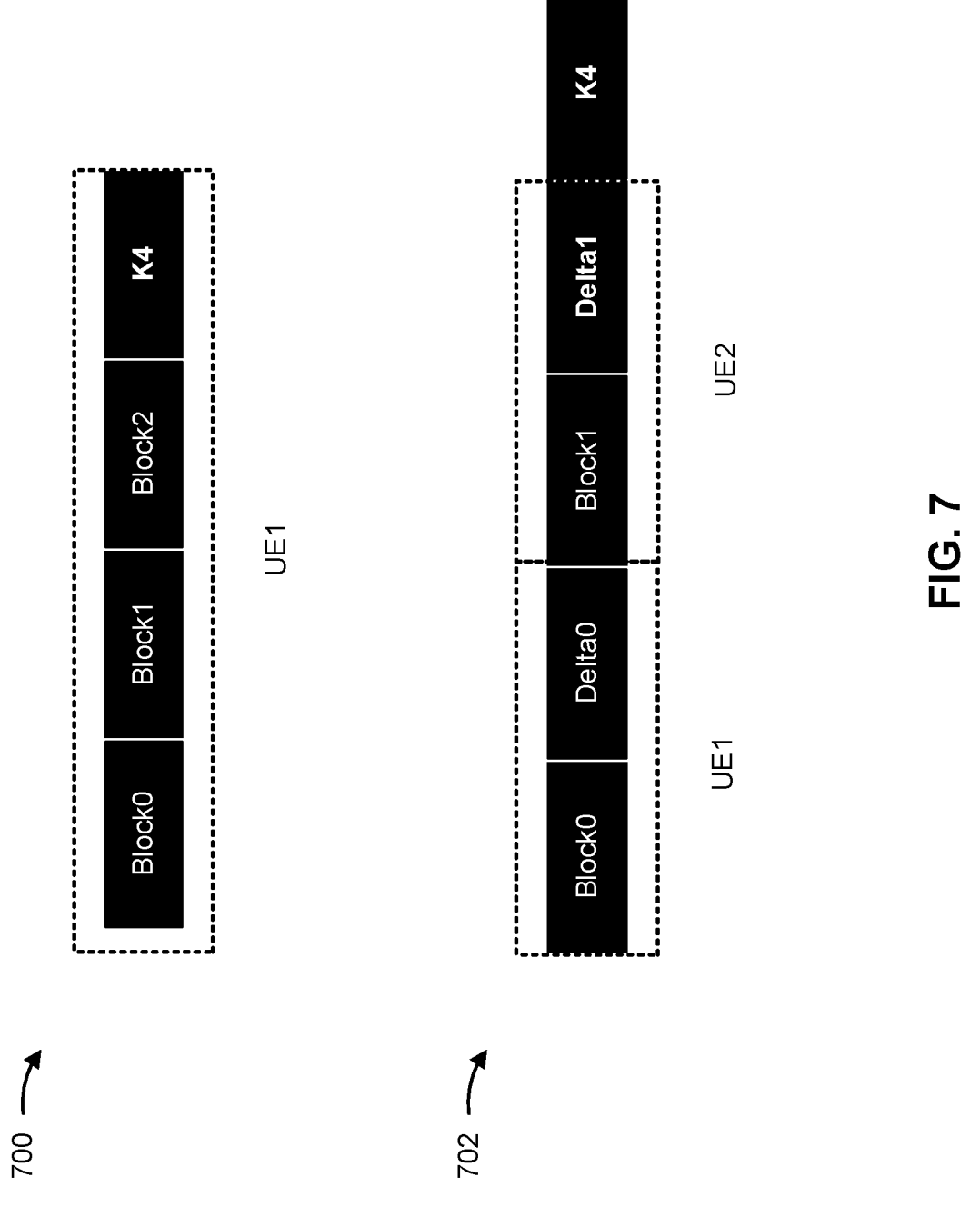
FIG. 7 is a diagram illustrating examples of acknowledgment timing for group-common DCI, in accordance with various aspects of the present disclosure.

FIG. 7 is a diagram illustrating examples 700, 702 of acknowledgment timing for group-common DCI, in accordance with various aspects of the present disclosure.

In some aspects, a base station (e.g., BS 610, a gNB) may indicate a specified amount of time (e.g., K4) in the group-common DCI for a UE (e.g., UE 620) to wait after receiving the group-common DCI before transmitting a feedback message. Example 700 in FIG. 7 shows a fourth indicator block that indicates the specified amount of time. The UE may know to identify the specified amount of time from the fourth indicator block based at least in part on a resource configuration.

In some aspects, the specified amount of time may include a common offset (e.g., K4) that is common to all UEs in a group of UEs and a UE-specific offset (e.g., delta). The UE may add the UE-specific offset to the common offset. The gNB may indicate the common offset in an RRC message and/or in the group-common DCI. The gNB may indicate UE-specific offsets in an RRC message and/or in the group-common DCI. The common offset and/or the UE-specific offset may be a predetermined offset. Example 702 in FIG. 7 shows a group-common DCI that indicates a first delta (Delta0) for UE1, a second delta (Delta1) for UE2, and a common offset (K4). Delta0 is located in a first portion (first two indicator blocks) of the group-common DCI set aside for UE1, and Delta1 is located in a second portion of the group-common DCI set aside for UE2.

UE1 may transmit a feedback message after waiting K4+Delta0 after receiving the group-common DCI. UE 2 may transmit a feedback message after waiting K4+Delta1 after the group-common DCI. In some aspects, the gNB may indicate the common offset in an RRC message (or the common offset may be predetermined) and indicate the UE-specific offset in the group-common DCI.

While a specific start event and stop event are described in the figures for the specified amount of time (end of receiving group-common DCI to start of transmitting PUCCH resource), other events may be used to define a start time and an end time for the specified amount of time. Actual transmission delays due to distance may or may not be accounted for in the specified amount of time.

As indicated above, FIG. 7 provides some examples. Other examples may differ from what is described with respect to FIG. 7.

Figure 8:
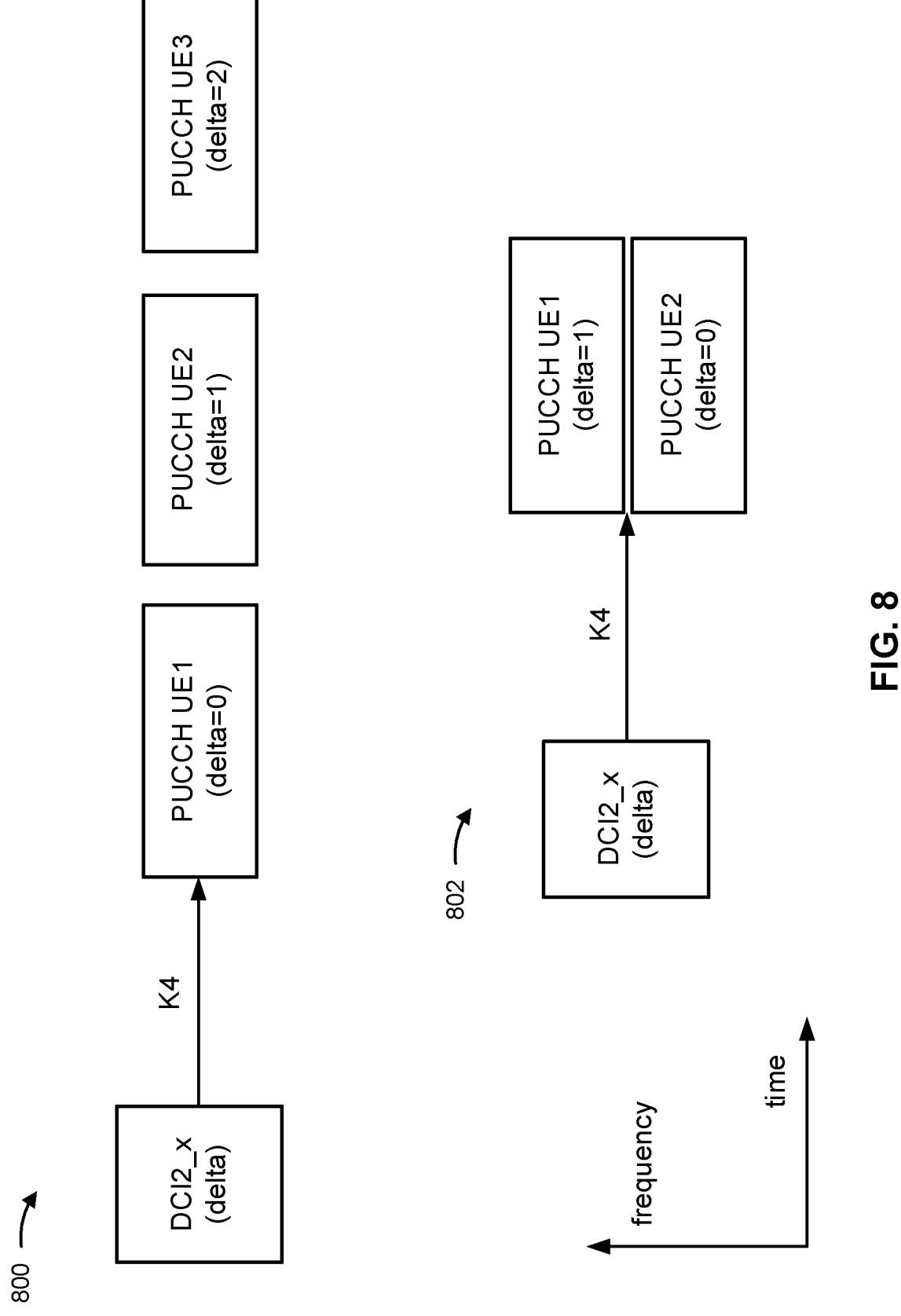
FIG. 8 is a diagram illustrating examples of acknowledgment timing for group-common DCI, in accordance with various aspects of the present disclosure.

FIG. 8 is a diagram illustrating examples 800, 802 of acknowledgment timing for group-common DCI, in accordance with various aspects of the present disclosure.

FIG. 8 shows an example 800 of timing offsets in a time division multiplexing distribution of PUCCH resources. For example, after a common offset (K4), UE1 transmits a feedback message at the end of the common offset (delta is 0), UE2 transmits a feedback message at another transmission occasion after UE1, and UE3 transmits a feedback message at a transmission occasion after UE2.

FIG. 8 shows an example 802 of a same timing offset where a delta indicates a frequency domain resource in an FDM distribution of PUCCH resources. For example, UE1 and UE2 both transmit respective feedback messages after an end of the common offset, but a delta of UE1 specifies a first frequency domain resource and a delta of UE2 specifies a second frequency domain resource that is different than the first frequency domain resource. By configuring a timing of feedback message transmissions, the gNB has greater flexibility in managing processing and signaling resources for receiving feedback messages from UEs in a group of UEs that are served by a single beam. As a result, the gNB may improve communications and save processing and signaling resources.

As indicated above, FIG. 8 provides some examples. Other examples may differ from what is described with respect to FIG. 8.

Figure 9:
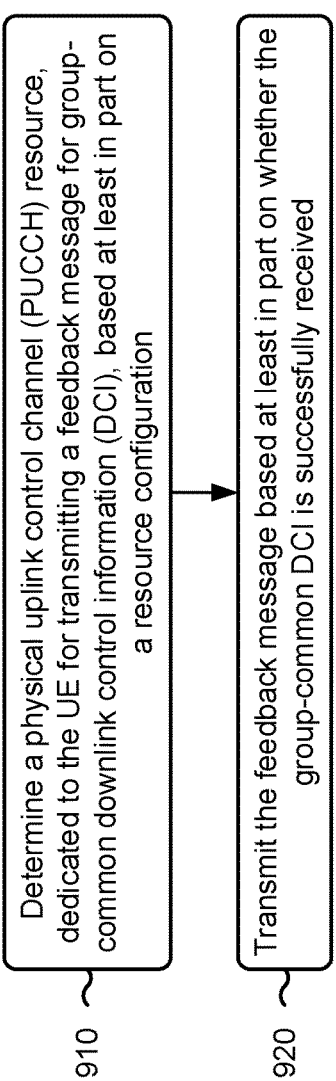
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., a UE 120 depicted in FIGS. 1 and 2, a UE depicted in FIGS. 3-5 and 7, a UE 620 depicted in FIG. 6, and/or the like) performs operations associated with acknowledgement location and timing for group-common DCI.

As shown in FIG. 9, in some aspects, process 900 may include determining a PUCCH resource, dedicated to the UE for transmitting a feedback message for group-common DCI, based at least in part on a resource configuration (block 910). For example, the UE (e.g., using receive processor 258, transmit processor 264, controller/processor 280, memory 282, and/or the like) may determine a PUCCH resource, dedicated to the UE for transmitting a feedback message for group-common DCI, based at least in part on a resource configuration, as described above.

As further shown in FIG. 9, in some aspects, process 900 may include transmitting the feedback message based at least in part on whether the group-common DCI is successfully received (block 920). For example, the UE (e.g., using receive processor 258, transmit processor 264, controller/processor 280, memory 282, and/or the like) may transmit the feedback message based at least in part on whether the group-common DCI is successfully received, as described above.

Process 900 may include additional aspects, such as any single aspect or any combination of aspects described below and/or in connection with one or more other processes described elsewhere herein.

In a first aspect, transmitting the feedback message includes transmitting an acknowledgement message based at least in part on a determination that the group-common DCI is successfully received.

In a second aspect, alone or in combination with the first aspect, transmitting the feedback message includes transmitting a negative acknowledgement message based at least in part on a determination that the group-common DCI is not successfully received.

In a third aspect, alone or in combination with one or more of the first and second aspects, process 900 includes receiving the resource configuration in an RRC message.

In a fourth aspect, alone or in combination with one or more of the first through third aspects, determining the PUCCH resource includes receiving an indication of the PUCCH resource in the group-common DCI.

In a fifth aspect, alone or in combination with one or more of the first through fourth aspects, a location of the indication is specified by the resource configuration.

In a sixth aspect, alone or in combination with one or more of the first through fifth aspects, the UE is in a group of UEs associated with the group-common DCI, and the group-common DCI includes an indication of a UE-specific PUCCH resource for each UE in the group of UEs.

In a seventh aspect, alone or in combination with one or more of the first through sixth aspects, transmitting the feedback message includes transmitting the feedback message a specified amount of time from receiving an end of the group-common DCI to a start of transmitting the PUCCH.

In an eighth aspect, alone or in combination with one or more of the first through seventh aspects, process 900 includes receiving an indication of the specified amount of time in an RRC message.

In a ninth aspect, alone or in combination with one or more of the first through eighth aspects, the specified amount of time is a predetermined amount of time.

In a tenth aspect, alone or in combination with one or more of the first through ninth aspects, the specified amount of time spans a specified quantity of transmission slots.

In an eleventh aspect, alone or in combination with one or more of the first through tenth aspects, process 900 includes receiving an indication of the specified amount of time in the group-common DCI.

In a twelfth aspect, alone or in combination with one or more of the first through eleventh aspects, the UE is in a group of UEs associated with the group-common DCI, and the specified amount of time includes a UE-specific offset and a common offset that is common to the group of UEs.

In a thirteenth aspect, alone or in combination with one or more of the first through twelfth aspects, process 900 includes receiving an indication of the common offset in an RRC message.

In a fourteenth aspect, alone or in combination with one or more of the first through thirteenth aspects, the common offset is a predetermined common offset.

In a fifteenth aspect, alone or in combination with one or more of the first through fourteenth aspects, process 900 includes receiving an indication of the UE-specific offset in the group-common DCI.

In a sixteenth aspect, alone or in combination with one or more of the first through fifteenth aspects, process 900 includes receiving an indication of the common offset in the group-common DCI.

In a seventeenth aspect, alone or in combination with one or more of the first through sixteenth aspects, process 900 includes receiving the indication of the UE-specific offset in a portion of the group-common DCI.

In an eighteenth aspect, alone or in combination with one or more of the first through seventeenth aspects, the specified amount of time for the UE is a same amount of time as a specified amount of time of another UE in the group of UEs, and a first frequency resource for the UE is a different frequency resource than a second frequency resource for the other UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
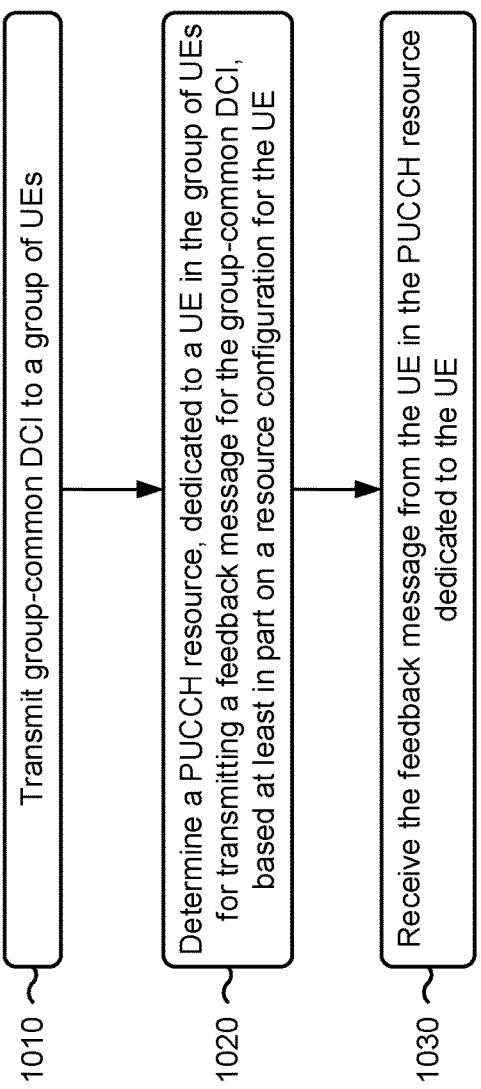
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., a BS 110 depicted in FIGS. 1 and 2, the base station depicted in FIG. 3, a BS 610 depicted in FIG. 6, and/or the like) performs operations associated with acknowledgement location and timing for group-common DCI.

As shown in FIG. 10, in some aspects, process 1000 may include transmitting group-common DCI to a group of UEs (block 1010). For example, the base station (e.g., using transmit processor 220, receive processor 238, controller/processor 240, memory 242, and/or the like) may transmit group-common DCI to a group of UEs, as described above.

As further shown in FIG. 10, in some aspects, process 1000 may include determining a PUCCH resource, dedicated to a UE in the group of UEs for transmitting a feedback message for the group-common DCI, based at least in part on a resource configuration for the UE (block 1020). For example, the base station (e.g., using transmit processor 220, receive processor 238, controller/processor 240, memory 242, and/or the like) may determine a PUCCH resource, dedicated to a UE in the group of UEs for transmitting a feedback message for the group-common DCI, based at least in part on a resource configuration for the UE, as described above.

As further shown in FIG. 10, in some aspects, process 1000 may include receiving the feedback message from the UE in the PUCCH resource dedicated to the UE (block 1030). For example, the base station (e.g., using transmit processor 220, receive processor 238, controller/processor 240, memory 242, and/or the like) may receive the feedback message from the UE in the PUCCH resource dedicated to the UE, as described above.

Process 1000 may include additional aspects, such as any single aspect or any combination of aspects described below and/or in connection with one or more other processes described elsewhere herein.

In a first aspect, receiving the feedback message includes receiving an acknowledgement message.

In a second aspect, alone or in combination with the first aspect, receiving the feedback message includes receiving a negative acknowledgement message.

In a third aspect, alone or in combination with one or more of the first and second aspects, process 1000 includes scheduling a communication for the UE based at least in part on the feedback message from the UE.

In a fourth aspect, alone or in combination with one or more of the first through third aspects, process 1000 includes transmitting the resource configuration to the UE in an RRC message.

In a fifth aspect, alone or in combination with one or more of the first through fourth aspects, process 1000 includes transmitting an indication of the PUCCH resource to the UE in the group-common DCI.

In a sixth aspect, alone or in combination with one or more of the first through fifth aspects, a location of the indication is specified by the resource configuration.

In a seventh aspect, alone or in combination with one or more of the first through sixth aspects, the group-common DCI includes an indication of a UE-specific PUCCH resource for each UE in the group of UEs.

In an eighth aspect, alone or in combination with one or more of the first through seventh aspects, receiving the feedback message includes receiving the feedback message based at least in part on a specified amount of time from the UE receiving an end of the group-common DCI to a start of the UE transmitting the PUCCH.

In a ninth aspect, alone or in combination with one or more of the first through eighth aspects, process 1000 includes transmitting an indication of the specified amount of time to the UE in an RRC message.

In a tenth aspect, alone or in combination with one or more of the first through ninth aspects, process 1000 includes transmitting an indication of the specified amount of time to the UE via a prefix.

In an eleventh aspect, alone or in combination with one or more of the first through tenth aspects, the specified amount of time spans a specified quantity of transmission slots.

In a twelfth aspect, alone or in combination with one or more of the first through eleventh aspects, process 1000 includes transmitting an indication of the specified amount of time in the group-common DCI.

In a thirteenth aspect, alone or in combination with one or more of the first through twelfth aspects, the specified amount of time includes a UE-specific offset and a common offset that is common to the group of UEs.

In a fourteenth aspect, alone or in combination with one or more of the first through thirteenth aspects, process 1000 includes transmitting an indication of the common offset in an RRC message.

In a fifteenth aspect, alone or in combination with one or more of the first through fourteenth aspects, process 1000 includes transmitting an indication of the common offset via a prefix.

In a sixteenth aspect, alone or in combination with one or more of the first through fifteenth aspects, process 1000 includes transmitting an indication of the UE-specific offset in the group-common DCI.

In a seventeenth aspect, alone or in combination with one or more of the first through sixteenth aspects, process 1000 includes transmitting an indication of the common offset in the group-common DCI.

In an eighteenth aspect, alone or in combination with one or more of the first through seventeenth aspects, process 1000 includes transmitting the indication of the UE-specific offset in a portion of the group-common DCI.

In a nineteenth aspect, alone or in combination with one or more of the first through eighteenth aspects, the specified amount of time for the UE is a same amount of time as a specified amount of time of another UE in the group of UEs, and a first frequency resource for the UE is a different frequency resource than a second frequency resource for the other UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining a physical uplink control channel (PUCCH) resource, dedicated to the UE for transmitting a feedback message for group-common downlink control information (DCI), based at least in part on a resource configuration and a PUCCH resource indicator (PRI) corresponding to the UE in the group-common DCI;

receiving an indication of a common offset in the group-common DCI;

receiving an indication of a UE-specific offset in an RRC message; and transmitting the feedback message, after a specified amount of time from a receipt of an end of the group-common DCI, based at least in part on whether the group-common DCI is successfully received, wherein the specified amount of time includes the common offset and the UE-specific offset.

2. The method of claim 1, wherein a location of the PRI in the group-common DCI is specified by the resource configuration.

3. The method of claim 1, wherein transmitting the feedback message comprises:

transmitting an acknowledgement message based at least in part on a determination that the group-common DCI is successfully received.

4. The method of claim 1, wherein transmitting the feedback message comprises:

transmitting a negative acknowledgement message based at least in part on a determination that the group-common DCI is not successfully received.

5. A method of wireless communication performed by a network entity, comprising:

transmitting group-common downlink control information (DCI) to a group of user equipments (UEs), wherein the group-common DCI includes an indication of a common offset corresponding the group of UEs;

transmitting an indication of a UE-specific offset in an RRC message to a UE in the group of UEs;

determining a physical uplink control channel (PUCCH) resource, dedicated to the UE for transmitting a feedback message for the group-common DCI, based at least in part on a resource configuration for the UE and a PUCCH resource indicator (PRI) corresponding to the UE in the group-common DCI; and receiving the feedback message from the UE in the PUCCH resource dedicated to the UE, wherein the feedback message is transmitted from the UE after a specified amount of time from a receipt of an end of the group-common DCI at the UE, and wherein the specified amount of time includes the common offset and the UE-specific offset.

6. The method of claim 5, wherein a location of the PRI in the group-common DCI is specified by the resource configuration.

7. A user equipment (UE) for wireless communication, comprising:

a memory; and one or more processors coupled to the memory, the one or more processors configured to:

determine a physical uplink control channel (PUCCH) resource, dedicated to the UE for transmitting a feedback message for group-common downlink control information (DCI), based at least in part on a resource configuration and a PUCCH resource indicator (PRI) corresponding to the UE in the group-common DCI;

receive an indication of a common offset in the group-common DCI;

receive an indication of a UE-specific offset in an RRC message; and transmit the feedback message, after a specified amount of time from a receipt of an end of the group-common DCI, based at least in part on whether the group-common DCI is successfully received, wherein the specified amount of time includes the common offset and the UE-specific offset.

8. The UE of claim 7, wherein the one or more processors, to transmit the feedback message, are configured to transmit an acknowledgement message based at least in part on a determination that the group-common DCI is successfully received.

9. The UE of claim 7, wherein the one or more processors, to transmit the feedback message, are configured to transmit a negative acknowledgement message based at least in part on a determination that the group-common DCI is not successfully received.

10. The UE of claim 7, wherein the one or more processors are configured to receive the resource configuration in a radio resource control message.

11. The UE of claim 7, wherein a location of the PRI in the group-common DCI is specified by the resource configuration.

12. The UE of claim 7, wherein the UE is in a group of UEs associated with the group-common DCI, and wherein the group-common DCI includes a UE-specific PRI for each UE in the group of UEs.

13. The UE of claim 7, wherein the specified amount of time is a predetermined amount of time.

14. The UE of claim 7, wherein the specified amount of time spans a specified quantity of transmission slots.

15. The UE of claim 7, wherein the one or more processors are configured to receive an indication of the specified amount of time in the group-common DCI.

16. The UE of claim 7, wherein the UE is in a group of UEs associated with the group-common DCI, and the common offset is common to the group of UEs.

17. The UE of claim 16, wherein the one or more processors are configured to receive an indication of the common offset in a radio resource control message.

18. The UE of claim 16, wherein the common offset is a predetermined common offset.

19. The UE of claim 16, wherein the one or more processors are configured to receive an indication of the UE-specific offset or the common offset in the group-common DCI.

20. The UE of claim 19, wherein the one or more processors are configured to receive the indication of the UE-specific offset in a portion of the group-common DCI.

21. The UE of claim 7,
wherein the specified amount of time for the UE is a same amount of time as a specified amount of time of another UE in a group of UEs, and wherein a first frequency resource for the UE is a different frequency resource than a second frequency resource for the other UE.

22. A network entity for wireless communication, comprising:
a memory; and
one or more processors coupled to the memory, the one or more processors configured to:
transmit group-common downlink control information (DCI) to a group of user equipments (UEs), wherein the group-common DCI includes an indication of a common offset corresponding the group of UEs;
transmit an indication of a UE-specific offset in an RRC message to a UE in the group of UEs;
determine a physical uplink control channel (PUCCH) resource, dedicated to the UE for transmitting a feedback message for the group-common DCI, based at least in part on a resource configuration for the UE and a PUCCH resource indicator (PRI) corresponding to the UE in the group-common DCI; and
receive the feedback message from the UE in the PUCCH resource dedicated to the UE, wherein the feedback message is transmitted from the UE after a specified amount of time from a receipt of an end of the group-common DCI at the UE, and wherein the specified amount of time includes the common offset and the UE-specific offset.

23. The network entity of claim 22,
wherein the one or more processors, when receiving the feedback message, are configured to receive an acknowledgement message or a negative acknowledgement message.

24. The network entity of claim 22,
wherein the one or more processors are configured to schedule a communication for the UE based at least in part on the feedback message from the UE.

25. The network entity of claim 22,
wherein a location of the PRI in the group-common DCI is specified by the resource configuration.

26. The network entity of claim 22,
wherein the group-common DCI includes a UE-specific PRI for each UE in the group of UEs.

27. The network entity of claim 22,
wherein the one or more processors are configured to configure the UE to use a predetermined amount of time as the specified amount of time.

28. The network entity of claim 22,
wherein the specified amount of time spans a specified quantity of transmission slots.

29. The network entity of claim 22,
wherein the one or more processors are configured to transmit an indication of the specified amount of time in the group-common DCI.

30. The network entity of claim 22,
wherein the specified amount of time includes a UE specific offset and a common offset is common to the group of UEs.

31. The network entity of claim 30,
wherein the one or more processors are configured to configure the UE to use a predetermined offset as the common offset.

32. The network entity of claim 30,
wherein the one or more processors are configured to transmit an indication of the UE-specific offset and an indication of the common offset in the group-common DCI.

33. The network entity of claim 32,
wherein the one or more processors are configured to transmit the indication of the UE-specific offset in a portion of the group-common DCI.

34. The network entity of claim 22,
wherein the specified amount of time for the UE is a same amount of time as a specified amount of time of another UE in the group of UEs, and wherein a first frequency resource for the UE is a different frequency resource than a second frequency resource for the other UE.

\* \* \* \* \*